Figure 1:
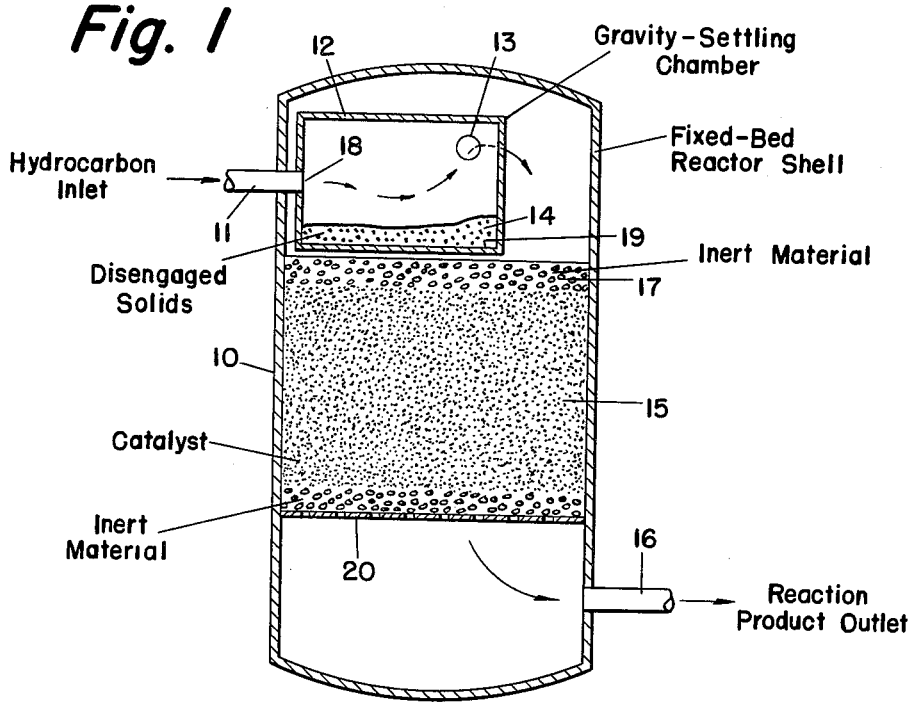

Aug. 6, 1963

R. L. DONOVAN 3,100,141

FIXED BED APPARATUS FOR THE CATALYTIC
CONVERSION OF HYDROCARBONS

Filed Oct. 18, 1960

INVENTOR.
ROY L. DONOVAN
BY Robert O. Spindle
ATTORNEY

3,100,141
FIXED BED APPARATUS FOR THE CATALYTIC CONVERSION OF HYDROCARBONS
Roy L. Donovan, North Hills, Wilmington, Del., assignor to Sun Oil Company, Philadelphia, Pa., a corporation of New Jersey
Filed Oct. 18, 1960, Ser. No. 63,291
2 Claims. (Cl. 23—288)

This invention relates to a process for converting hydrocarbons containing entrained foreign material. It particularly relates to apparatus wherein the entrained material is removed from the hydrocarbon prior to conversion. It especially relates to a gravity-settling chamber located within and made a part of the fixed bed catalytic reactor.

The catalytic conversion processes to which this invention is applicable includes hydrodesulfurization, hydrogenation, dehydrogenation, polymerization, alkylation, dealkylation, oxidation, isomerization, aromatization, cyclization and other hydrocarbon synthesis reactions. Usually these processes are chemical reactions in which reactant material is contacted with a fixed bed of catalyst. This invention would not be particularly applicable to the moving or fluidized bed systems.

It is known that these processes are dependent upon catalyst reactivity for economical operation. However, it has been found that in the use of charge materials containing sulfur in, say, reforming operations, scale is formed in such an extent and picked up or entrained by the incoming charge materials that the catalyst bed is soon coated with this foreign material with the result that the catalyst is partially deactivated and excessive pressure drop develops across the bed. The net effect is decreased plant throughout and poisoned catalyst which must be replaced.

In the past, removal of this scale from the incoming charge material has been through the use of so-called "guard cases" and/or processing to remove the sulfur compounds. It is evident that such schemes are excessively expensive. Processing to remove sulfur, for example, usually involves a hydrogenation process which is costly. "Guard cases" are also expensive because these catalytic conversion processes are operated at pressures between 15 p.s.i. and 10,000 p.s.i., more commonly 300 to 2500 p.s.i., and temperatures ranging from 100° F. to 1500° F.; and consequently, equipment for the removal of entrained particles located outside the reactor must have sufficient strength to withstand these operating conditions.

However, these difficulties are overcome by placing the unit for the removal of entrained solids from the charge materials within the reactor and periodically removing the disengaged particles. Since the pressure within and without such a unit is substantially the same and since the unit is surrounded by the vapors of the charge material at approximately the same temperature, the unit can be constructed with a minimum of strength and consequently can be constructed most inexpensively.

It is an object of this invention to provide a process for handling hydrocarbon materials containing entrained solid particles in a fixed bed catalytic reactor.

It is a further object to provide an apparatus which disengages these foreign solid particles from the hydrocarbon stream prior to contact with the catalyst.

In general, the present invention provides for placing a gravity settling chamber as a separate and distinct unit within the reactor and above the fixed bed of catalyst, injecting the hydrocarbons containing entrained solid particles into the reactor via the settling chamber wherein the solid particles drop out by the force of gravity and are retained therein; passing the cleaned hydrocarbon stream through the bed of catalyst, and withdrawing reaction products therefrom.

The construction of a gravity settling chamber can be by any of the means known to the art. However, since the entrained particles may range in size from minus 200 microns to several inches, more particularly to 300–2600 microns, the chamber should have sufficient volume to reduce the linear velocity of the incoming charge by a factor of at least 5, preferably 10. For example, if the incoming charge contains particles ranging in diameter from minus 300 microns to about 2600 microns and is traveling at 100 feet per second, the chamber should be of sufficient volume to reduce the velocity to 13–20 ft./sec. in order to remove the bulk of these particles.

Figure 2:
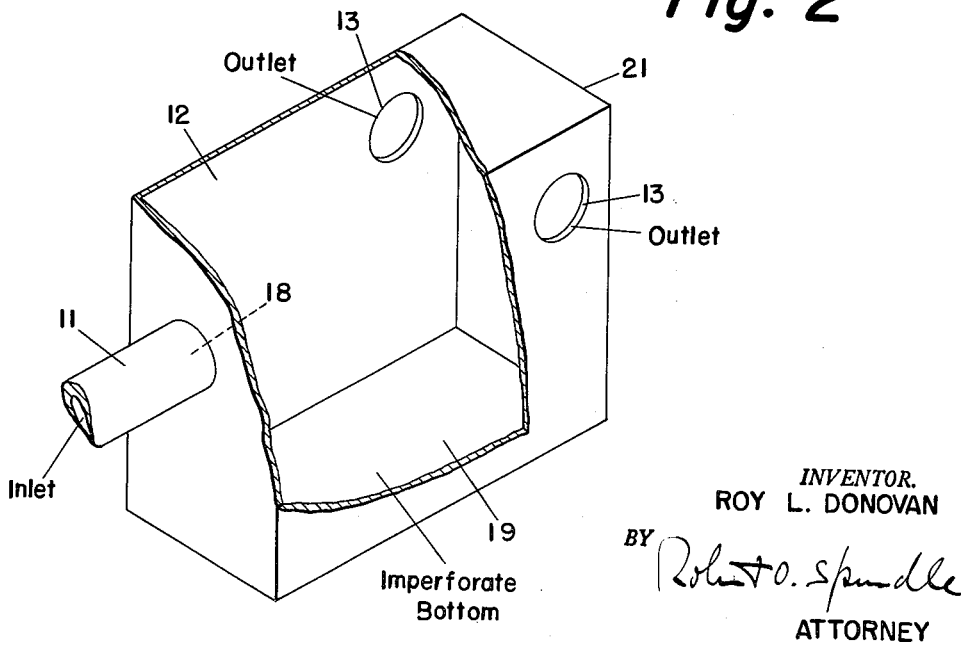

The present invention may be more fully understood by reference to the accompanying drawings in which:

FIGURE 1 is a diagrammatic sketch of a suitable fixed bed reactor containing a gravity settling chamber, and FIGURE 2 is a schematic sketch of one embodiment of a gravity settling chamber.

Referring to FIGURE 1:

Reactor 10 is of any suitable design generally insulated and provided with hydrocarbon inlet 11 and reaction products outlet 16. Suitably placed between the inlet and outlet means is the reaction zone containing catalyst 15, which usually rests on a vapor pervious grid support 20 and has placed upon the uppermost level a layer of inert material 17. Oftentimes, catalyst 15 rests on a layer of inert material also.

The gravity settling chamber 12 is positioned within the fixed bed reactor shell such that hydrocarbon inlet 11 is connected directly with the settling chamber inlet 18. The chamber is constructed with an imperforate bottom 19 so that the solids 14 disengaged therein will remain until removed periodically by suitable manual means. The upper portion of the chamber is perforated with vapor outlet vents 13.

As defined herein "perforated upper portion" of the chamber includes vent holes 13, as in FIGURE 2; louvres along the sides and/or top section 21; perforated holes similar to a sieve plate design; combinations of these; and any other convenient means for releasing the cleaned hydrocarbon vapors from the gravity-settling chamber into the reactor vessel proper.

An illustrative embodiment of the process of the present invention is as follows:

18,000 barrels per day of straight-run gasoline having a 62.5° API gravity and molecular weight of 94 is charged with 2,600,000 standard cubic feet per hour of recycle gas at 950° F. and 300 p.s.i.g. pressure to reactor vessel 10 via inlet 11. Vessel 10 is about 6 feet inside diameter by 17 feet in vertical height. It is filled with 4700 pounds of commercially available platinum reforming catalyst. A gravity settling chamber 12 is attached directly to inlet 11. The chamber is constructed as in FIGURE 2 with the following dimensions:

| | Inches |
|---|---|
| Width | 17 |
| Height | 37.5 |
| Length | 36 |

The outlet vents 13 and the inlet 18 are 10 inches inside diameter. The hydrocarbons plus recycle gas enter chamber 12 at a velocity of 100 feet per second and are initially reduced to 13.4 ft./sec. when the chamber is empty of solids. At the time of shutdown for catalyst regeneration, approximately 2 inches of scale are accumulated on the imperforate bottom 19 with the result that the velocity is only reduced to 19.7 ft./sec. for the incoming vapors. The former velocity is sufficient to cause particles down to 300 microns to drop out and the latter velocity removes particles down to 700 microns.

The cleaned vapors leave chamber 12 via outlet vents 13 and flow downwardly through insert material 17 and catalyst bed 15 with the reaction products leaving vessel 10 via outlet means 16 to separating, fractionating, and similar units (not shown).

The two inches of scale 14 which accumulated in chamber 12 during the run are removed manually during the plant turnaround time.

In the following table are listed the size distribution data for the solid particles recovered from chamber 12:

| Particle size, microns | Percent of particle in range | Percent of total weight in range |
|---|---|---|
| 30–100 | 11 | (¹) |
| 100–300 | 37 | 0.3 |
| 300–500 | 26 | 1.1 |
| 500–2,600 | 22 | 98.6 |
| 7,000 | 4 | (¹) |

¹ Negligible.

Therefore, from the foregoing it is seen that a simple, easy to construct, inexpensive gravity settling chamber located within a catalytic fixed bed reactor is useful for removing solid particles ranging from 300–2600 micron diameters from incoming reformer feed stocks.

As defined herein the term "hydrocarbons containing entrained solids" includes the total stream comprising essentially hydrocarbons, particles, hydrogen and recycle gases. This term also includes those hydrocarbon charge stocks which are not used with gaseous diluents such as hydrogen and the recycle gases.

I claim:

1. A fixed bed reactor vessel for the catalytic conversion of hydrocarbons containing entrained solid particles which comprises in combination: a normally vertically disposed shell having a reaction zone containing catalyst located therein, inlet means in the upper portion of said shell and above said reaction zone; outlet means for removing the conversion products from said vessel; means for maintaining a fixed bed of catalyst in said reaction zone through which said hydrocarbon stream must pass in flowing from said inlet means to said outlet means; a gravity-settling chamber having an imperforate bottom for the collection of entrained solid particles and a perforate upper portion for releasing cleaned hydrocarbons, said chamber mounted within said reactor shell as a separate and distinct unit therefrom above the reaction zone and connected directly with said inlet means.

2. A fixed bed reactor vessel according to claim 1 wherein said chamber has sufficient volume to reduce the linear velocity of said solids-containing hydrocarbon stream by a factor of at least 5.

References Cited in the file of this patent

UNITED STATES PATENTS

| | | |
|---|---|---|
| 2,014,287 | Newman | Sept. 10, 1935 |
| 2,795,489 | Kassel | June 11, 1957 |
| 3,006,740 | Maggio | Oct. 31, 1961 |